United States Patent
Rakib et al.

(10) Patent No.: US 8,359,455 B2
(45) Date of Patent: Jan. 22, 2013

(54) SYSTEM AND METHOD FOR GENERATING REAL ADDRESSES USING A CONNECTION ID DESIGNATING A BUFFER AND AN ACCESS PATTERN

(76) Inventors: Shlomo Selim Rakib, Cupertino, CA (US); Marc Schaub, Sunnyvale, CA (US)

( * ) Notice: Subject to any disclaimer, the term of this patent is extended or adjusted under 35 U.S.C. 154(b) by 802 days.

(21) Appl. No.: 12/331,324

(22) Filed: Dec. 9, 2008

(65) Prior Publication Data

US 2010/0146238 A1  Jun. 10, 2010

(51) Int. Cl.
*G06F 12/00* (2006.01)
*G06F 12/10* (2006.01)

(52) U.S. Cl. .................. 711/217; 711/202; 711/220

(58) Field of Classification Search ............ 711/202, 711/217, 220, 221
See application file for complete search history.

(56) References Cited

U.S. PATENT DOCUMENTS

| | | | | |
|---|---|---|---|---|
| 5,386,524 A | * | 1/1995 | Lary et al. | 711/206 |
| 2007/0266206 A1 | * | 11/2007 | Kim et al. | 711/118 |
| 2009/0132787 A1 | * | 5/2009 | Rakib et al. | 712/30 |

OTHER PUBLICATIONS

Zarai et al, "Hilbert Space-Filling by Piecewise-Linear Index Transformation," IEEE Signal Processing Letters, vol. 15, Issue 1, 2008, pp. 717-720.*
Jagadish, "Linear Clustering of Objects with Multiple Attributes," Proceedings of the 1990 ACM SIGMOD Int'l. Conference on Management of Data, 1990, pp. 332-342.*

* cited by examiner

*Primary Examiner* — Matthew Bradley
*Assistant Examiner* — Glenn Gossage
(74) *Attorney, Agent, or Firm* — Stephen E. Zweig

(57) ABSTRACT

A system and method for generating a real address in data memory in response to a read/write request may include generating an access request to at least one of read and write data to the data memory. A connection identifier (ID), received in association with the access request; may include a buffer ID designating a buffer in the data memory in which to access the data, and a port ID designating a pattern in which to access the data in the buffer. The method may further include translating the connection ID into the real address of the data memory, and accessing the data memory at a location corresponding to the real address. Different types of buffers, such as point-to-point, scatter, and gather buffers may be used, and different patterns, such as first-in-first out (FIFO), nested loop, matrix transforms may be used.

22 Claims, 13 Drawing Sheets

300

| PE 0 | PE 4 | PE 8 | PE 12 |
| --- | --- | --- | --- |
| PE 1 | PE 5 | PE 9 | PE 13 |
| PE 2 | PE 6 | PE 10 | PE 14 |
| PE 3 | PE 7 | PE 11 | PE 15 |

Fig. 4

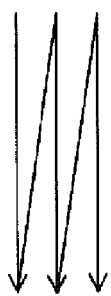
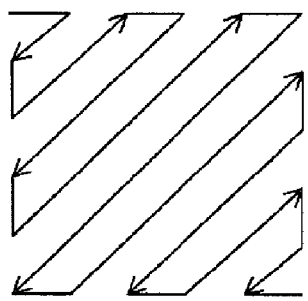
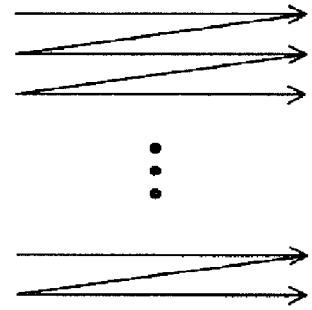
Fig. 13A     1300a  Fig. 13B     1302a  Fig. 13C
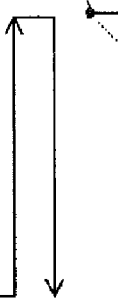
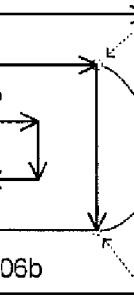
Fig. 13D     1306a  Fig. 13E     1304a  Fig. 13F
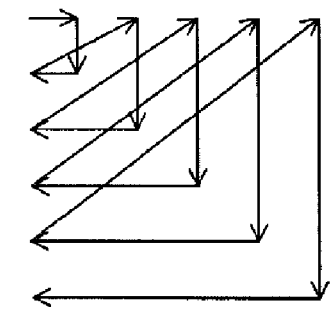
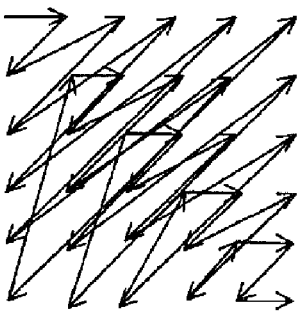
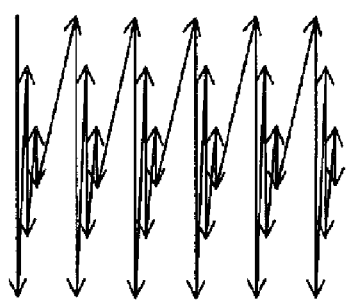
Fig. 13G     Fig. 13H     Fig. 13I
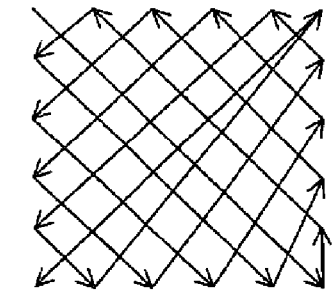
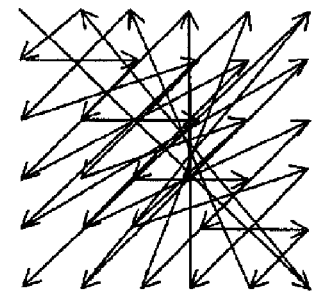
Fig. 13J     Fig. 13K

SYSTEM AND METHOD FOR GENERATING REAL ADDRESSES USING A CONNECTION ID DESIGNATING A BUFFER AND AN ACCESS PATTERN

BACKGROUND

This invention relates to data processing, and more particularly to apparatus and methods for generating real addresses in data processing architectures.

Signal and media processing (also referred to herein as "data processing") is pervasive in today's electronic devices. This is true for cell phones, media players, personal digital assistants, gaming devices, personal computers, home gateway devices, and a host of other devices. From video, image, or audio processing, to telecommunications processing, many of these devices must perform several if not all of these tasks, often at the same time.

For example, a typical "smart" cell phone may require functionality to demodulate, decrypt, and decode incoming telecommunications signals, and encode, encrypt, and modulate outgoing telecommunication signals. If the smart phone also functions as an audio/video player, the smart phone may require functionality to decode and process the audio/video data. Similarly, if the smart phone includes a camera, the device may require functionality to process and store the resulting image data. Other functionality may be required for gaming, wired or wireless network connectivity, general-purpose computing, and the like. The device may be required to perform many if not all of these tasks simultaneously.

Similarly, a "home gateway" device may provide basic services such as broadband connectivity, Internet connection sharing, and/or firewall security. The home gateway may also perform bridging/routing and protocol and address translation between external broadband networks and internal home networks. The home gateway may also provide functionality for applications such as voice over Internet protocol (VoIP) and/or video over IP, audio/video streaming, audio/video recording, online gaming, wired or wireless network connectivity, home automation, virtual private network (VPN) connectivity, security surveillance, or the like. In certain cases, home gateway devices may enable consumers to remotely access their home networks and control various devices over the Internet.

Depending on the device, many of the tasks it performs may be processing-intensive and require some specialized hardware or software. In some cases, devices may utilize a host of different components to provide some or all of these functions. For example, a device may utilize certain chips or components to perform modulation and demodulation, while utilizing other chips or components to perform video encoding and processing. Other chips or components may be required to process images generated by a camera. This may require wiring together and integrating a significant amount of hardware and software.

Currently, there is no unified architecture or platform that can efficiently perform many or all of these functions, or at least be programmed to perform many or all of these functions. Thus, what is needed is a unified platform or architecture that can efficiently perform tasks such as data modulation, demodulation, encryption, decryption, encoding, decoding, transcoding, processing, analysis, or the like, for applications such as video, audio, telecommunications, and the like. Further needed is a unified platform or architecture that can be easily programmed to perform any or all of these tasks, possibly simultaneously. Such a platform or architecture would be highly useful in home gateways or other integrated devices, such as mobile phones, personal digital assistants (PDAs), video/audio players, gaming devices, or the like.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which:

FIG. 4 is a high-level block diagram of one embodiment of an array of processing elements inside the cluster;

FIGS. 13A through 13K are block diagrams showing various access patterns for scanning two-dimensional data structures using end-point to end-point patterns.

DETAILED DESCRIPTION

Figure 1:
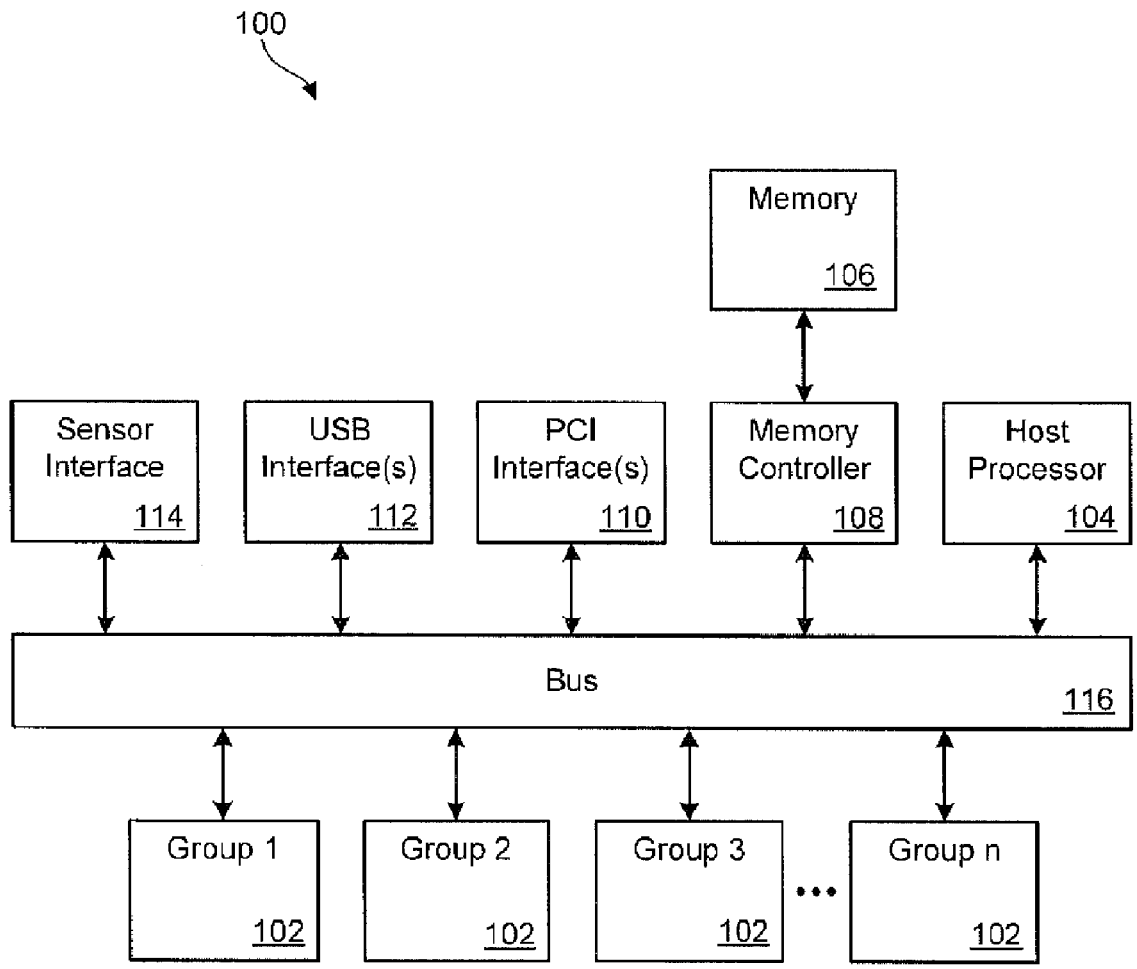
FIG. 1 is a high-level block diagram of one embodiment of a data processing architecture in accordance with the invention.

The present invention provides a novel apparatus and method for generating real addresses in data memory in response to read/write requests. The features and advantages of the present invention will become more fully apparent from the following description and appended claims, or may be learned by the practice of the invention as set forth hereinafter.

In a first embodiment of the invention, a method for generating a real address in data memory in response to a read/write request may include generating an access request to at least one of read and write data to a data memory. A connection identifier (ID) may be received in association with the access request. This connection ID may include a buffer ID designating a buffer in data memory to which to access the data, and a port ID designating a pattern in which to access the data in the buffer. The method may further include translating the connection ID into a real address of the data memory, and accessing the data in the data memory at a location corresponding to the real address.

In selected embodiments, the buffer may be one of a point-to-point, broadcast, scatter, and gather buffer, which will be explained in more detail hereafter. Similarly, the pattern may be one of a FIFO, nested loop, matrix transform, non-recursive, and end-point pattern, which will also be explained in more detail hereafter.

In certain embodiments, a buffer descriptor table may be used to store a buffer descriptor associated with the buffer ID. This buffer descriptor may store one or more of a buffer type, buffer attributes, and buffer base address. The buffer descriptor may be updated when data is accessed in the data memory. Similarly, a port table may be used to store a port descriptor associated with the port ID. The port descriptor may store one or more of a port type, port attributes, and port offset. The port descriptor may also be updated when data is accessed in the data memory.

In another embodiment of the invention, a system to generate a real address in a data memory in response to a read/write request may include an array of processing elements to generate an access request (e.g., a read and/or write request). An address generation unit may receive a connection ID in association with the access request. This connection ID may include a buffer ID designating a buffer in data memory in which to access the data, and a port ID designating a pattern in which to access the data in the buffer. The address generation unit may be further configured to translate the connection ID into a real address in data memory. The array of processing elements may be configured to access the data in the data memory at a location corresponding to the real address.

In another embodiment of the invention, a method for generating a real address in a data memory in response to a read/write request may include generating an access request to at least one of read and write data to a data memory. A connection ID may be received in association with the access request. The connection ID may designate one or more of a buffer in data memory in which to access the data, and a pattern in which to access the data in the buffer. The connection ID may then be translated into a real address in the data memory. The data may then be accessed in the data memory at a location corresponding to the real address.

In another embodiment of the invention, a system to generate a real address in data memory in response to a read/write request may include an array of processing elements to generate an access request, such as a read and/or write request. An address generation unit may receive a connection ID in association with the access request. The connection ID designates one or more of a buffer in data memory in which to access the data, and a pattern in which to access the data in the buffer. The address generation unit may be configured to translate the connection ID into a real address in the data memory. The array of processing elements may be configured to access the data in the data memory at a location corresponding to the real address.

It will be readily understood that the components of the present invention, as generally described and illustrated in the Figures herein, may be arranged and designed in a wide variety of different configurations. Thus, the following more detailed description of the embodiments of the apparatus and methods of the present invention, as represented in the Figures, is not intended to limit the scope of the invention, as claimed, but is merely representative of selected embodiments of the invention.

Many of the functional units described in this specification are shown as modules (or functional blocks) in order to emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays (FPGA), programmable array logic (PAL), programmable logic devices (PLD) or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details may be provided, such as examples of programming, software modules, user selections, or the like, to provide a thorough understanding of embodiments of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, one embodiment of a data processing architecture 100 in accordance with the invention is illustrated. The data processing architecture 100 may be used to process (i.e., encode, decode, transcode, analyze, process) audio or video data although it is not limited to processing audio or video data. The flexibility and configurability of the data processing architecture 100 may also allow it to be used for tasks such as data modulation, demodulation, encryption, decryption, or the like, to name just a few. In certain embodiments, the data processing architecture may perform several of the above-stated tasks simultaneously as part of a data processing pipeline.

Figure 2:
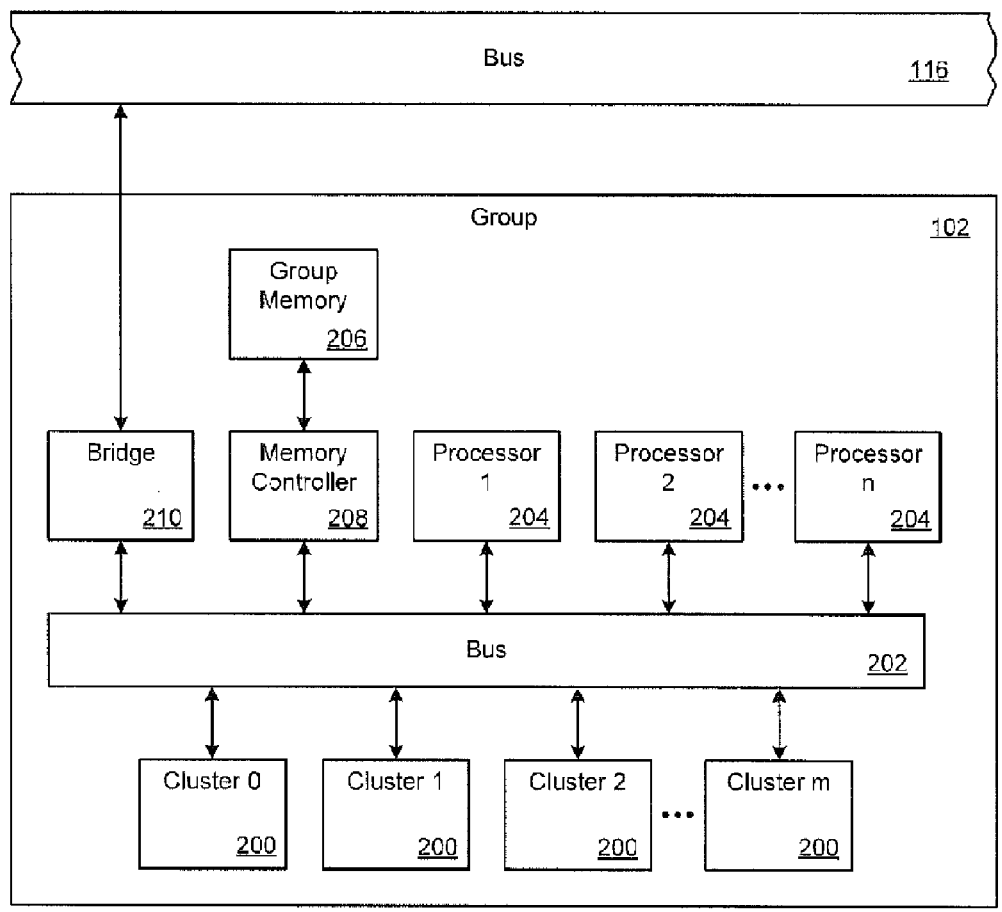
FIG. 2 is a high-level block diagram showing one embodiment of a group of clusters in the data processing architecture.
Figure 3:
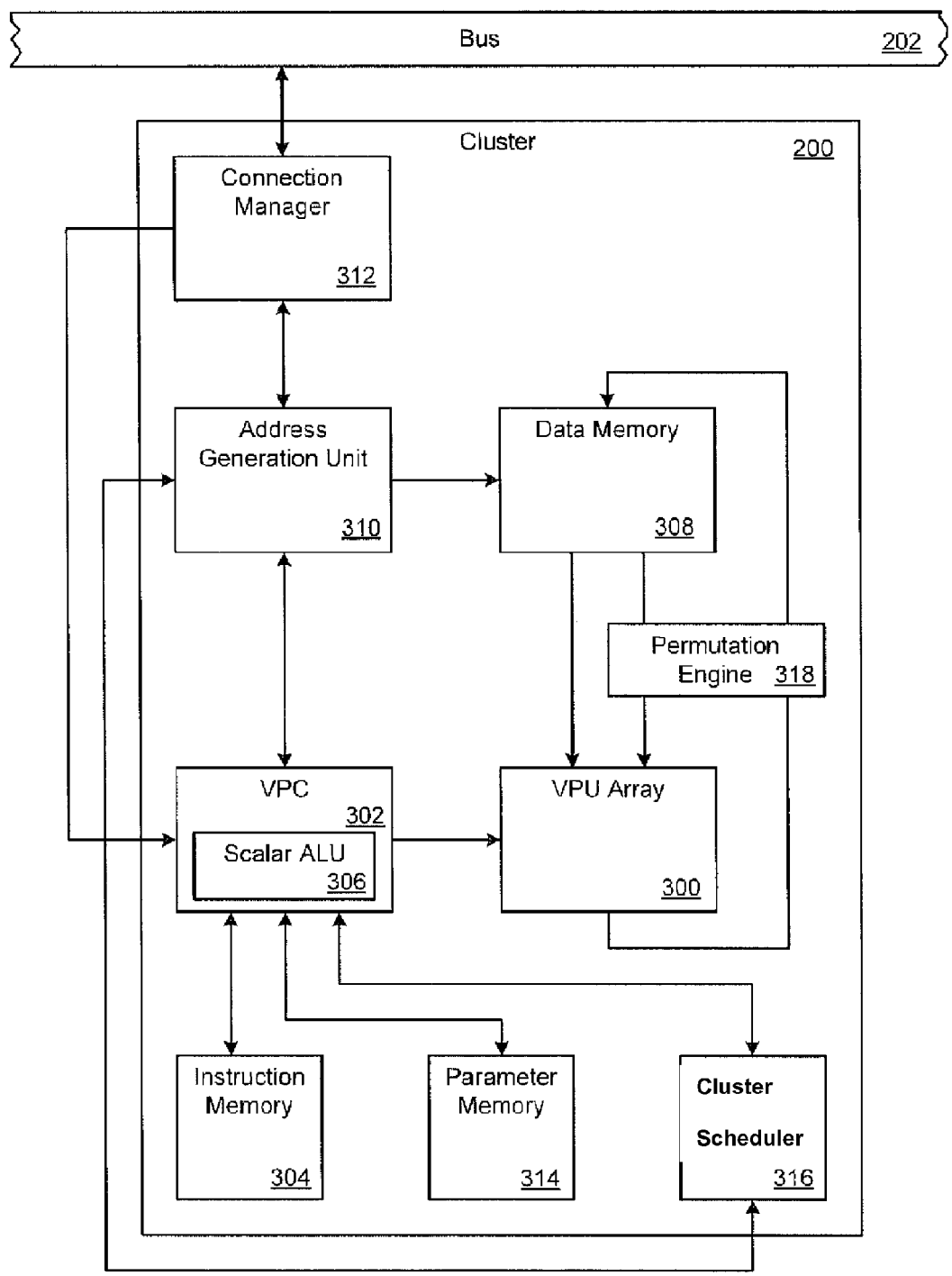
FIG. 3 is a high-level block diagram showing one embodiment of a cluster containing an array of processing elements (i.e., a vector processing unit (VPU) array)

In certain embodiments, the data processing architecture 100 may include one or more groups 102, each containing one or more clusters of processing elements (as shown in FIGS. 2 and 3). By varying the number of groups 102 and/or the number of clusters within each group 102, the processing power of the data processing architecture 100 may be scaled up or down for different applications. For example, the processing power of the data processing architecture 100 may be considerably different for a home gateway device than it is for a mobile phone.

The data processing architecture 100 may also be configured to perform certain tasks (e.g., demodulation, decryption, decoding) simultaneously. For example, certain groups and/or clusters within each group may be configured for demodulation while others may be configured for decryption or decoding. In other cases, different clusters may be configured to perform different steps of the same task, such as performing different steps in a pipeline for encoding or decoding video data. The data processing architecture 100 may provide a unified platform for performing various tasks without the need for supporting hardware.

In certain embodiments, the data processing architecture 100 may include one or more processors 104, memory 106, memory controllers 108, interfaces 110, 112 (such as peripheral component interconnect (PCI) interfaces 110 and/or universal serial bus (USB) interfaces 112), and sensor interfaces 114. A bus 116, such as a crossbar switch 116, may be used to connect the components together. A crossbar switch 116 may be useful because it provides a scalable interconnect that can mitigate possible throughput and contention issues.

In operation, data, such as video data, may be streamed through the interfaces 110, 112 into a data buffer memory 106. This data may be streamed from the data buffer memory 106 to group memories 206 (as shown in FIG. 2) and then to cluster memories 308 (as shown in FIG. 3), each forming part of a memory hierarchy. The groups and clusters will be described in more detail in FIGS. 2 and 3. In certain embodiments, a data pipeline may be created by streaming data from one cluster to another, with each performing a different function. After the data processing is complete, the data may be streamed out of the cluster memories 308 to the group memories 206, and then from the group memories 206 to the data buffer memory 106 and out one or more of the interfaces 110, 112.

A host processor 104 (e.g., a Microprocessor without Interlocked Pipelined Stages (MIPS) processor 104) may control and manage the actions of each of the components 102, 108, 110, 112, 114 and act as a supervisor for the data processing architecture 100. A sensor interface 114 may interface with various sensors (e.g., an Infrared Data Association (IRDA) sensor) which may receive commands from various control devices (e.g., a remote control). The host processor 104 may receive the commands from the sensor interface 114 and take appropriate action. For example, if the data processing architecture 100 is configured to decode television channels and the host processor 104 receives a command to begin decoding a particular television channel, the processor 104 may determine what the current loads of each of the groups 102 are and determine where to start a new process. For example, the host processor 104 may decide to distribute this new process over multiple groups 102, keep the process within a single group 102, or distribute it across all of the groups 102. In this way, the host processor 104 may perform load-balancing between the groups 102 and determine where particular processes are to be performed within the data processing architecture 100.

Referring to FIG. 2, one embodiment of a group 102 is illustrated. In general, a group 102 may be a semi-autonomous data processing unit that may include one or more clusters 200 of processing elements. The components of the group 102 may communicate over a bus 202, such as a crossbar switch 202. The internal components of the clusters 102 will be explained in more detail in association with FIG. 3. The group 102 may include one or more management processors 204 (e.g., MIPS processors 204), large local group memories 206 and associated memory controllers 208. A bridge 210 may connect the group 102 to the primary bus 116 illustrated in FIG. 1. Among other duties, the management processors 204 may perform load balancing across the clusters 200 and dispatch tasks to individual clusters 200 based on their availability. Prior to dispatching a task, the management processors 204 may, if needed, send parameters to the clusters 200 in order to program them to perform particular tasks. For example, the management processors 204 may send parameters to program an address generation unit, a cluster scheduler, or other components within the clusters 200, as shown in FIG. 3.

Referring to FIG. 3, in selected embodiments, a cluster 200 in accordance with the invention may include an array 300 of processing elements (i.e., a vector processing unit (VPU) array 300). An instruction memory 304 may store instructions associated with all the threads running on the cluster 200 and intended for the VPU array 300. A vector processor unit controller (VPC) 302 may fetch instructions from the instruction memory 304, decode the instructions, and transmit the decoded instructions to the VPU array 300 in a "modified single instruction multiple data (SIMD)" fashion. As will be explained in more detail in association with FIG. 6, the VPC 302 may act in a "modified SIMD" fashion by grouping particular processing elements and applying an instruction modified to each group. This may allow different processing elements to handle the same instruction differently. For example, this mechanism may be used to cause half of the processing elements to perform an addition (ADD) instruction while the other half performs a subtraction (SUB) instruction, all in response to a single instruction from the instruction memory 304. This feature adds a significant amount of flexibility and functionality to the cluster 200 as will be shown in more detail hereafter.

The VPC 302 may have associated therewith a scalar arithmetic logic unit (ALU) 306 which may perform scalar algorithm computations, perform control-related functions, and manage the operation of the VPU array 300. For example, the scalar ALU 306 may reconfigure the processing elements by modifying the groups that the processing elements belong to or designating how the processing elements should handle instructions based on the group they belong to.

The cluster 200 may also include a data memory 308 storing vectors having a defined number (e.g., sixteen) of elements. In certain embodiments, the number of elements in each vector may be equal to the number of processing elements in the VPU array 300. Similarly, in selected embodiments, each vector element may include a defined number (e.g., sixteen) of bits. The number of bits in each element may be equal to the width (e.g., sixteen bits) of the data path between the data memory 308 and each processing element. It follows that if the data path between the data memory 308 and each processing element is 16-bits wide, the data ports (i.e., the read and write ports) to the data memory 308 may be 256-bits wide (16 bits for each of the 16 processing elements). These numbers are presented only by way of example are not intended to be limiting.

In selected embodiments, the cluster 200 may include an address generation unit 310 to generate real addresses when reading data from the data memory 308 or writing data back to the data memory 308. As will be explained in association with FIGS. 7 and 8, in selected embodiments, the address generation unit 310 may generate addresses in response to read/write requests from either the VPC 302 or connection manager 312 in a way that is transparent to the VPC 302 and connection manager 312. The cluster 200 may include a connection manager 312, communicating with the bus 202, whose primary responsibility is to transfer data into and out of the cluster 200.

In selected embodiments, instructions fetched from the instruction memory 304 may include a multiple-slot instruction (e.g., a three-slot instruction). For example, where a three-slot instruction is used, up to two (i.e., 0, 1, or 2) instructions may be sent to each processing element and up to one (i.e., 0 or 1) instruction may be sent to the scalar ALU 306. Instructions sent to the scalar ALU 306 may, for example, be used to change the grouping of processing elements, change how each group of processing elements should handle a particular instruction, or change the configuration of a permutation engine 318. In certain embodiments, the processing elements within the VPU array 300 may be considered parallel-semantic, variable-length VLIW (very long instruction word) processors, where the packet length is at least two instructions. Thus, in certain embodiments, the processing elements in the VPU array 300 may execute at least two instructions in parallel in a single clock cycle.

In certain embodiments, the cluster 200 may further include a parameter memory 314 to store parameters of various types. For example, the parameter memory 314 may store a processing element (PE) map to designate which group each processing element belongs to. The parameters may also include an instruction modifier designating how each group of processing elements should handle a particular instruction. In selected embodiments, the instruction modifier may designate how to modify at least one operand of the instruction, such as a source operand, destination operand, or the like. This concept will be explained in more detail in association with FIGS. 6A and 6B.

In selected embodiments, the cluster 200 may be configured to execute multiple threads simultaneously in an interleaved fashion. In certain embodiments, the cluster 200 may have a certain number (e.g., two) of active threads and a certain number (e.g., two) of dormant threads resident on the cluster 200 at any given time. Once an active thread has finished executing, a cluster scheduler 316 may determine the next thread to execute. In selected embodiments, the cluster scheduler 316 may use a Petri net or other tree structure to determine the next thread to execute, and to ensure that any necessary conditions are satisfied prior to dispatching a new thread. As previously mentioned, in certain embodiments, one or more of the group processors 204 (shown in FIG. 2) may program the cluster scheduler 316 with the appropriate Petri nets/tree structures prior to executing a program on the cluster 200.

Because a cluster 200 may execute and finish threads very rapidly, it is important that threads can be scheduled in an efficient manner. In certain embodiments, an interrupt may be generated each time a thread has finished executing so that a new thread may be initiated and executed. Where threads are relatively short, the interrupt rate may become so high that thread scheduling has the potential to undesirably reduce the processing efficiency of the cluster 200. Thus, apparatus and methods are needed to improve scheduling efficiency and ensure that scheduling does not create bottlenecks in the system. To address this concern, in selected embodiments, the cluster scheduler 316 may be implemented in hardware as opposed to software. This may significantly increase the speed of the cluster scheduler 316 and ensure that new threads are dispatched in an expeditious manner. Nevertheless, in certain cases, the cluster hardware scheduler 316 may be bypassed and scheduling may be managed by other components (e.g., the group processor 204).

In certain embodiments, the cluster 200 may include permutation engine 318 to realign data that is read from or written to the data memory 308. The permutation engine 318 may be programmable to allow data to be reshuffled in a desired order before or after it is processed by the VPU array 300. In certain embodiments, the programming for the permutation engine 318 may be stored in the parameter memory 314. The permutation engine 318 may permute data having a width (e.g., 256 bits) corresponding to the width of the data path between the data memory 308 and the VPU array 300. In certain embodiments, the permutation engine 318 may be configured to permute data with a desired level of granularity. For example, the permutation engine 318 may reshuffle data on a byte-by-byte basis or other desired level of granularity.

Referring to FIG. 4, as previously mentioned, the VPU array 300 may include an array of processing elements, such as an array of sixteen processing elements (hereinafter labeled PE 0 through PE 15). As previously mentioned, these processing elements may simultaneously execute the same instruction on multiple data elements (i.e., a vector of data elements) in a "modified SIMD" fashion, as will be explained in more detail in FIGS. 6A and 6B. In the illustrated embodiment, the VPU array 300 includes sixteen processing elements arranged in a 4×4 array, with each processing element configured to process a sixteen bit data element. This arrangement of processing elements allows data to be passed between the processing elements in a specified manner as will be discussed in association with FIG. 5. Nevertheless, the VPU array 300 is not limited to a 4×4 array. Indeed, the cluster 200 may be configured to function with other n×n or even n×m arrays of processing elements, with each processing element configured to process a data element of a desired size.

Figure 5:
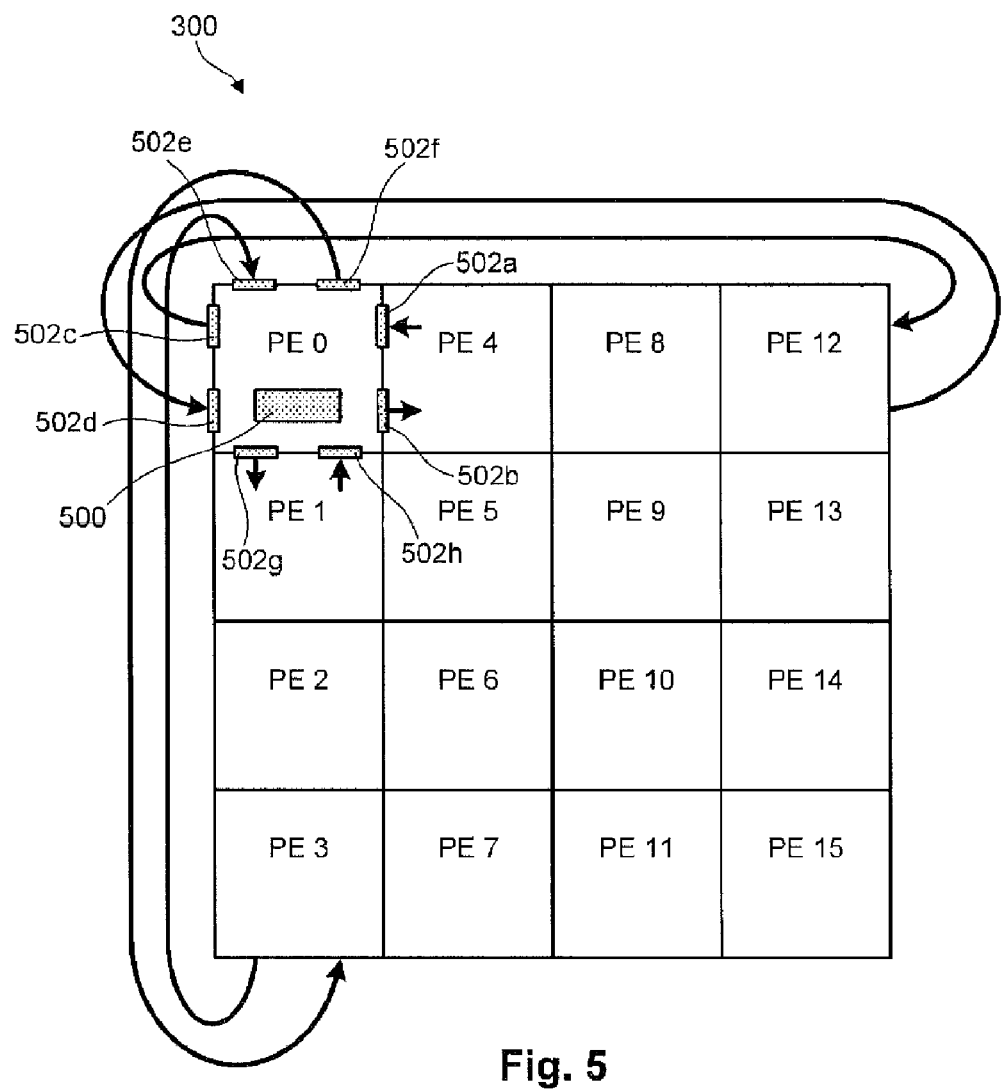
FIG. 5 is a high-level block diagram showing various registers within the VPU array.

Referring to FIG. 5, in selected embodiments, each of the processing elements of the VPU array 300 may include various registers to store data while it is being operated on. For example, the processing elements may include one or more internal general purpose registers 500 in which to store data. In addition, each of the processing elements may include one or more exchange registers 502 to transfer data between the processing elements. This may allow the processing elements to communicate with neighboring processing elements without the need to save the data to data memory 308 and then reload the data into internal registers 500.

For example, in selected embodiments, an exchange register 502a may have a read port that is coupled to PE 0 and a write port that is coupled to PE 4, allowing data to be transferred from PE 4 to PE 0. Similarly, an exchange register 502b may have a read port that is coupled to PE 4 and a write port that is coupled to PE 0, allowing data to be transferred from PE 0 to PE 4. This enables two-way communication between adjacent processing elements PE 0 and PE 4.

Similarly, for those processing elements on the edge of the array 300, the processing elements may be configured for "wrap-around" communication. For example, in selected embodiments, an exchange register 502c may have a write port that is coupled to PE 0 and a read port that is coupled to PE 12, allowing data to be transferred from PE 0 to PE 12. Similarly, an exchange register 502d may have a write port that is coupled to PE 12 and a read port that is coupled to PE 0, allowing data to be transferred from PE 12 to PE 0. Similarly, exchange registers 502e, 502f may enable two-way communication between processing elements PE 0 and PE 3 and exchange registers 502g, 502h may enable two-way communication between processing elements PE 0 and PE 1.

In certain embodiments, the cluster 200 may be configured such that data may be loaded from data memory 308 into either the internal registers 500 or the exchange registers 502 of the VPU array 300. The cluster 200 may also be configured such that data may be loaded from the data memory 308 into the internal registers 500 and exchange registers 502 simultaneously. Similarly, the cluster 200 may also be configured such that data may be transferred from either the internal registers 500 or the exchange registers 502 to data memory 308.

Figure 6A:
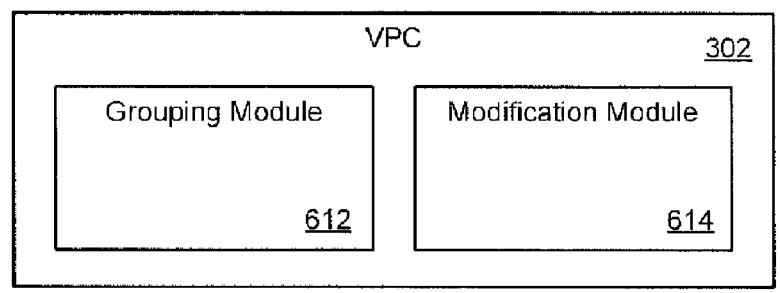
FIG. 6A is a high-level block diagram showing a VPC (vector processor unit controller) containing a grouping module and a modification module.

Referring to FIG. 6A, as previously mentioned, in selected embodiments, the VPU array 300 may be configured to act in a "modified SIMD" fashion. This may enable certain processing elements to be grouped together and the groups of processing elements to handle instructions differently. To provide this functionality, in selected embodiments, the VPC 302 may contain a grouping module 612 and a modification module 614. In general, the grouping module 612 may be used to assign each processing element within the VPU array 300 to one of several groups. A modification module 614 may designate how each group of processing elements should handle different instructions.

Figure 6B:
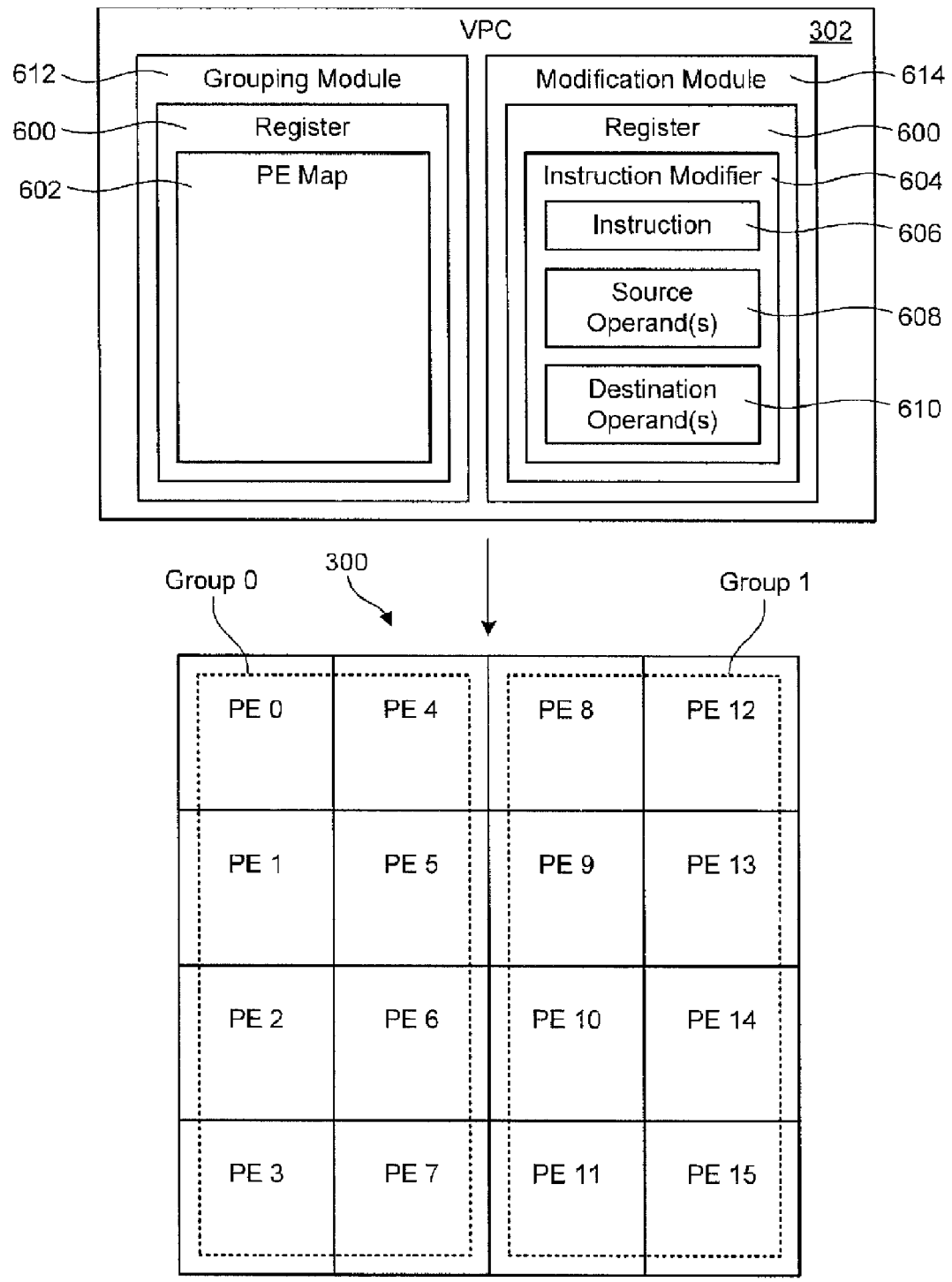
FIG. 6B is a more specific embodiment of a VPC wherein the grouping module includes a processing element (PE) map and the modification module includes an instruction modifier.

FIG. 6B shows one example of a method for implementing the grouping module 612 and modification module 614 of FIG. 6A. In selected embodiments, the grouping module 612 may include a PE map 602 to designate which group each processing element belongs to. This PE map 602 may, in certain embodiments, be stored in a register 600 on the VPC 302. This register 600 may be read by each processing element so that it can determine which group it belongs to. For example, in selected embodiments, the PE map 602 may store two bits for each processing element (e.g., 32 bits total for 16 processing elements), allowing each processing element to be assigned to one of four groups (groups 0, 1, 2, and 3). This PE map 602 may be updated as needed by the scalar ALU 306 to change the grouping.

In selected embodiments, the modification module 614 may include an instruction modifier 604 to designate how each group should handle an instruction 606. Like the PE map 602, this instruction modifier 604 may, in certain embodiments, be stored in a register 600 that may be read by each processing element in the array 300. For example, consider a VPU array 300 where the PE map 602 designates that PE 0 through PE 7 belong to "group 0" and PE 8 through PE 15 belong to "group 1." An instruction modifier 604 may designate that group 0 should handle an ADD instruction as an ADD instruction, while group 1 should handle the ADD instruction as a SUB instruction. This will allow each group to handle the ADD instruction differently. Although the ADD instruction is used in this example, this feature may be used for a host of different instructions.

In certain embodiments, the instruction modifier 604 may also be configured to modify a source operand 608 and/or a destination operand 610 of an instruction 606. For example, if an ADD instruction is designed to add the contents of a first source register (R1) to the contents of a second source register (R2) and to store the result in a third destination register (R3), the instruction modifier 604 may be used to modify any or all of these source and/or destination operands. For example, the instruction modifier 604 for a group may modify the above-described instruction such that a processing element will use the source operand in the register (R5) instead of R1 and will save the destination operand in the destination register (R8) instead of R3. In this way, different processing elements may use different source and/or destination operands 608, 610 depending on the group they belong to.

Figure 7:
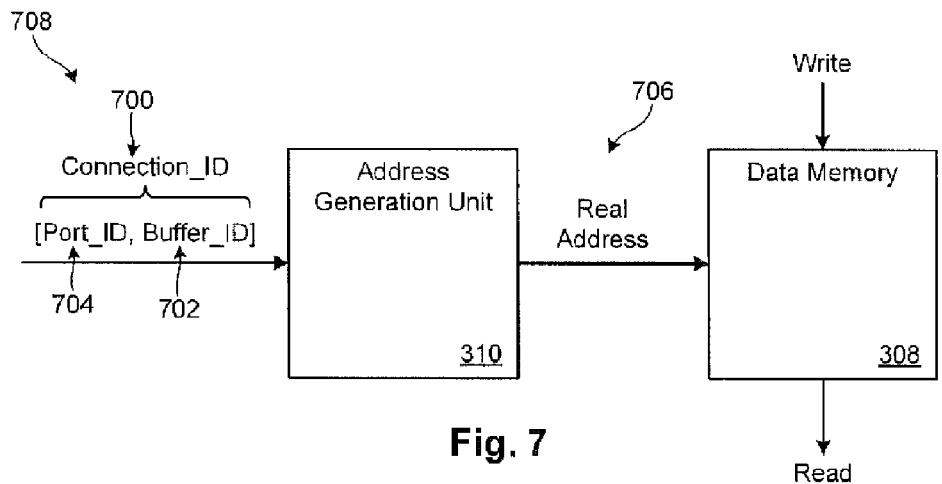
FIG. 7 is a high-level block diagram showing one embodiment of an address generation unit within a cluster.

Referring to FIG. 7, as previously mentioned, in selected embodiments, an address generation unit 310 may be used to generate real addresses in response to read/write requests from either the VPC 302 or the connection manager 312. In selected embodiments, the cluster 200 may be configured such that the VPC 302 and connection manager 312 make read or write requests to a "connection" 708 as opposed to specifying the real address 706 in data memory 308 where the read or write is to occur. This allows real addresses 706 to be generated in a way that is transparent to code in the instruction memory 304 and executed on the VPU array 300, thereby simplifying the writing of code for the cluster 200. That is, code that is executed by the VPU array 300 may read and write to "connections" 708 as opposed to real addresses 706 in data memory 308. The address generation unit 310 may be configured to translate the "connections" 708 into real addresses 706.

In selected embodiments, a "connection" 708 may be identified by a connection ID 700. Thus, whenever code attempts to read or write to the data memory 308, the code may identify a connection_ID 700 as opposed to a real address 706. In certain embodiments, the connection ID 700 may be composed of both a buffer_ID 702 and a port_ID 704. The buffer_ID 702 and port_ID 704 may correspond to a buffer and port, respectively. In general, the buffer may identify one or more regions in data memory 308 in which to read or write data. The port, on the other hand, may identify an access pattern for reading or writing data to the buffer. Various different types of buffers and ports will be explained in more detail in association with FIGS. 9A through 13K.

In selected embodiments, the connection_ID 700 may be made up of a pre-defined number of bits (e.g., sixteen bits). Accordingly, the buffer_ID 702 and port_ID 704 may use some portion of the pre-defined number of bits. For example, where the connection_ID 700 is sixteen bits, the buffer_ID 702 may make up the lower seven bits of the connection_ID 700 and the port_ID 704 may make up the upper nine bits of the connection 1D 700. This allows for $2^7$ (i.e., 128) buffers and $2^9$ (i.e., 512) ports.

Figure 8:
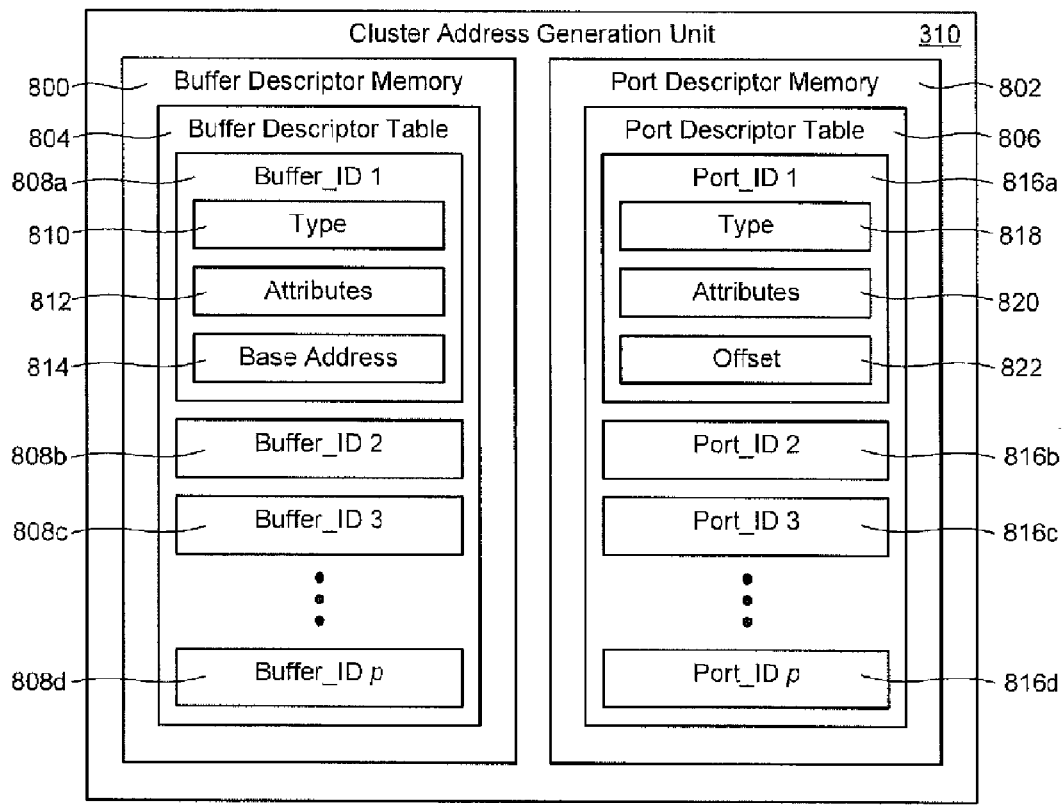
FIG. 8 is a high-level block diagram showing additional details of an address generation unit in accordance with the invention.

Referring to FIG. 8, in selected embodiments, the address generation unit 310 may include various mechanisms for translating the connection_ID 700 into real addresses 706. For example, in certain embodiments, the address generation unit 310 may include a buffer descriptor memory 800 and a port descriptor memory 802. These memories 800, 802 may be two separate memory devices or the same memory device.

In selected embodiments, the buffer descriptor memory 800 may contain a buffer descriptor table 804 containing buffer records 808 (808a-808d in FIG. 8). In certain embodiments, the buffer records 808 are indexed by buffer_ID 702, although other indexing methods are also possible. Along with other information, the buffer records 808 may include a type 810, which may describe the type of buffer associated with the buffer_ID. In selected embodiments, buffer types may include but are not limited to "point-to-point," "broadcast," "scatter," and "gather" buffer types, which will be explained in more detail in association with FIGS. 9A through 9D.

The buffer records 808 may also store attributes 812 associated with the buffers. These attributes 812 may include, among other information, the size of the buffer, a data available indicator (indicating whether data is available that may be read from the buffer), a space available indicator (indicating whether space is available in the buffer to write data), or the like. In selected embodiments, the buffer record 808 may also include a buffer base address 814. Using the buffer base address 814 and an offset 822 (as will be described in more detail hereafter), the address generation unit 310 may calculate real addresses in the data memory 308 when reading or writing thereto. The address generation unit 310 may generate the real addresses internally, eliminating the need for external code to specify real addresses for reading and writing.

Similarly, in selected embodiments, the port descriptor memory 802 may store a port descriptor table 806 containing port records 816. In certain embodiments, the port records 816 are also indexed by port_ID 704. In certain embodiments, the port records 816 (816a-816d in FIG. 8) may store a type 818, which may describe the type of port associated with the port_ID 704. In selected embodiments, port types may include but are not limited to "FIFO," "matrix transform," "nested loop," "end point pattern" (EPP), and "non-recursive pattern" (NRP) port types, various ones of which will be explained in more detail in association with FIGS. 11A through 13K.

The port records 816 may also store attributes 820 of the ports they describe. These attributes 820 may vary depending on the type of port. For example, attributes 820 for a "nested loop" port may include, among other information, the number of times the nested loops are repeated, the step size of the loops, the dimensions of the two-dimensional data structure (to support wrapping in each dimension), or the like. Similarly, for an "end point pattern" port, the attributes 820 may include, among other information, the end points to move between when scanning the vectors in a buffer, the step size between the end points, and the like. Similarly, for a "matrix transform" port, the attributes 820 may include the matrix that is used to generate real addresses, or the like. The attributes 820 may also indicate whether the port is a "read" or "write" port.

In general, the attributes 820 may include the rules or parameters required to advance the offset 822 as vectors are read from or written to the buffer. The rules may follow either a "FIFO," "matrix transform," "nested loop," "end point pattern" (EPP), or "non-recursive pattern" model, as previously discussed, depending on the type 818 of port. The offset 822 may be defined as the distance from the base address 814 of the buffer where data is read from or written to memory 308 (depending on whether the port is a "read" or "write" port). The offset 822 may be updated in the port descriptor 816a when data is read from or written to the data memory 308 using the port 816a. The address generation unit 310 may advance and keep track of the offset 822 internally, making it transparent to code executed on the VPU array 300.

Referring to FIGS. 9A through 9D, various embodiments of the "point-to-point," "broadcast," "scatter," and "gather" buffers briefly described above are explained in more detail.

Figure 9A:
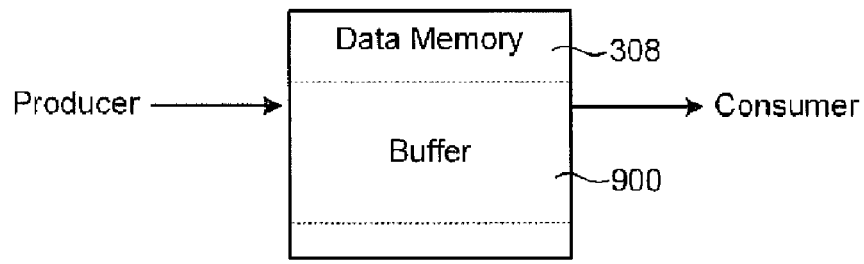
FIG. 9A is a block diagram showing one embodiment of a "point-to-point" buffer.
Figure 9B:
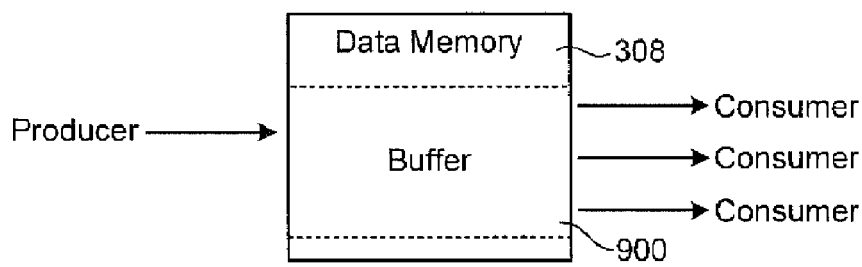
FIG. 9B is a block diagram showing one embodiment of a "broadcast" buffer.
Figure 9C:
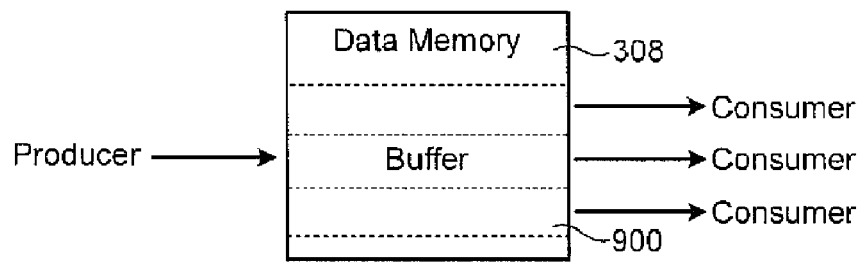
FIG. 9C is a block diagram showing one embodiment of a "scatter" buffer.
Figure 9D:
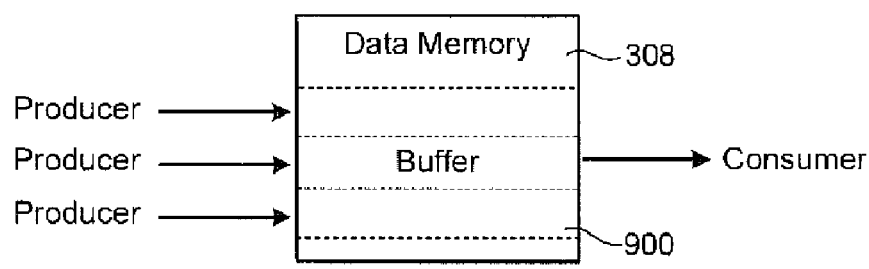
FIG. 9D is a block diagram showing one embodiment of a "gather" buffer.

FIG. 9A is a block diagram showing one example of a "point-to-point" buffer; FIG. 9B is a block diagram showing one example of a "broadcast" buffer; FIG. 9C is a block diagram showing one example of a "scatter" buffer; and FIG. 9D is a block diagram showing one example of a "gather" buffer.

"Point-to-Point" Buffer

As illustrated in FIG. 9A, a point-to-point buffer may be generally defined as a buffer where there is a single producer (associated with a single write port) that writes data to a buffer 900, and a single consumer (associated with a single read port) that reads the data from the buffer 900 written by the producer. In selected embodiments, the consumer reads the data in the same order in which it was written to the buffer 900. In other embodiments, the consumer reads the data in a different order from which it was written to the buffer 900. For example, the read port of the consumer may be defined as a "FIFO" port, whereas the write port of the producer may be defined as a "nested loop" port. This may cause the consumer to read the data in a different pattern than it was written by the producer.

"Broadcast" Buffer

As shown in FIG. 9B, a broadcast buffer may be generally defined as a buffer 900 where each vector that is written to the buffer 900 by a single producer (with a single write port) may be broadcast to multiple consumers (each with a different read port). Stated otherwise, each vector that is written to the buffer 900 by a single producer may be consumed by multiple consumers. Nevertheless, in certain cases, although the consumers may read the same data from the same buffer, the consumers may be reading from different parts of the buffer at any given time.

"Scatter" Buffer

As shown in FIG. 9C, a scatter buffer may be generally defined as a buffer 900 in which vectors that are written to the buffer 900 by a single producer (with a single write port) may be "scattered" for consumption by multiple consumers (each with a different read port). In certain embodiments, a scatter buffer may be implemented by establishing several sub-buffers (or subdivisions) within a larger buffer 900. For example, if a producer writes three vectors to the larger buffer 900, the first vector may be written to a first sub-buffer, the second vector may be written to a second sub-buffer, and the third vector may be written to a third sub-buffer within the buffer 900. Vectors that are written to the first sub-buffer may be consumed by a first consumer, vectors that are written to the second sub-buffer may be consumed by a second consumer, and vectors that are written to the third sub-buffer may be consumed by a third consumer. Thus, this type of buffer 900 enables a producer to "scatter" vectors across various sub-buffers, each of which may be consumed by a different consumer. This is similar to the broadcast buffer except that each vector that is written to the buffer 900 is only consumed by a single consumer as opposed to multiple consumers. Thus, unlike the broadcast buffer, all the consumers do not share the same data.

"Gather" Buffer

As shown in FIG. 9D, a gather buffer may be generally defined as a buffer in which vectors generated by multiple producers may be gathered together into a single buffer. In certain embodiments, this type of buffer may also be implemented by establishing a number of sub-buffers within a larger buffer. For example, a first producer may be configured to write data to a first sub-buffer within the buffer, a second producer may be configured to write data to a second sub-buffer within the buffer, and a third producer may be configured to write data to a third sub-buffer within the buffer. A single consumer may be configured to consume the data produced by the multiple producers. In this way, data generated by multiple producers may be "gathered" together so that it may be consumed by a single or smaller number of consumers.

Figure 10:
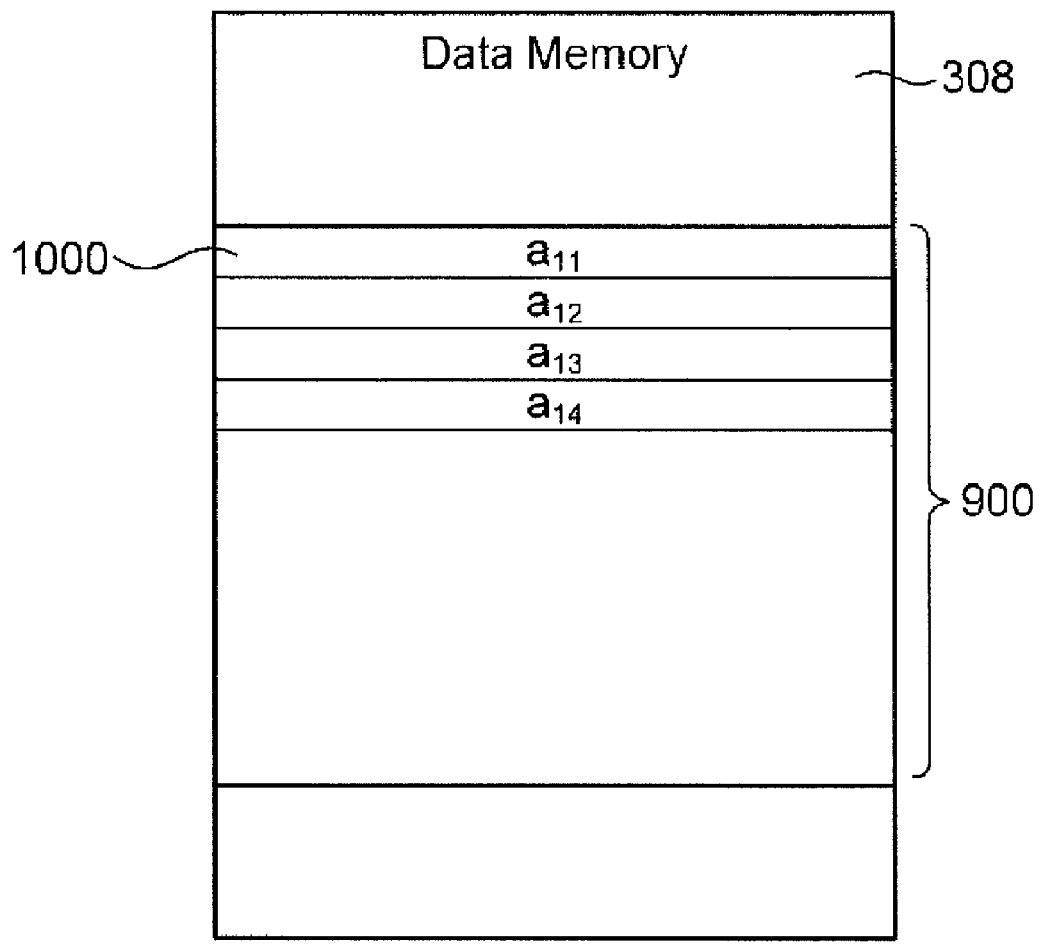
FIG. 10 is a block diagram showing how vectors may be stored within a buffer.

Referring to FIG. 10, as previously mentioned, a buffer 900 may identify one or more regions in data memory 308 in which to read or write data. A buffer 900 may store vectors 1000 (herein shown as vectors $a_{11}$, $a_{12}$, $a_{13}$, $a_{14}$) with each vector 1000 storing a defined number (e.g., sixteen) of elements, and each element storing a defined number (e.g., sixteen) of bits. The number of elements in each vector may be equal to the number of processing elements in the VPU array 300.

In selected applications, the buffer 900 may be used to store a multi-dimensional data structure, such as a two-dimensional data structure (e.g., two-dimensional video data). The VPU array 300 may operate on the multi-dimensional data structure. In such an embodiment, each of the vectors 1000 may represent some portion of the multi-dimensional data structure. For example, where the multi-dimensional data structure is a two-dimensional data structure, each of the vectors 1000 may represent a 4×4 block of pixels, where each element of a vector 1000 represents a pixel within the 4×4 block.

Figure 11A:
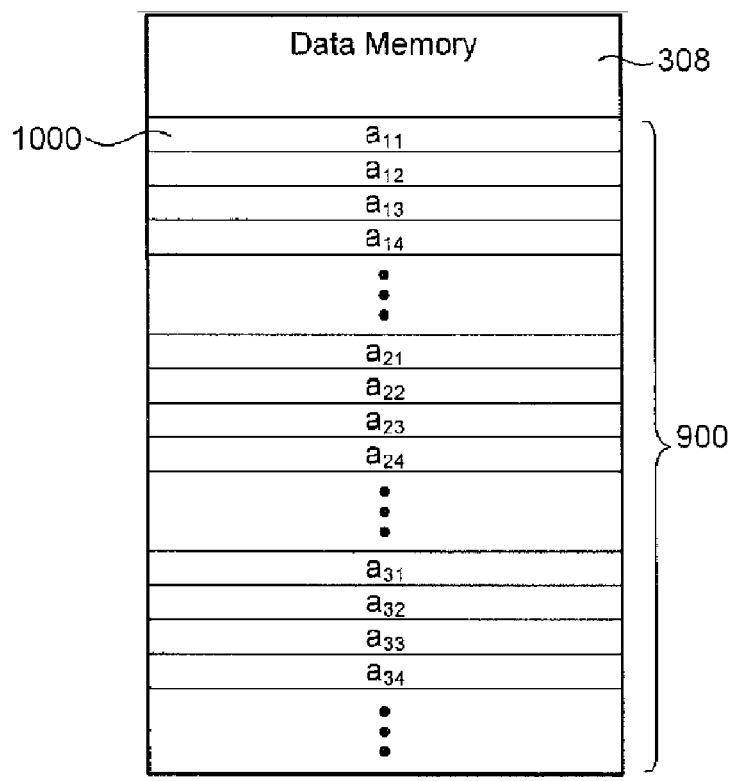
FIG. 11A is a block diagram showing how a two-dimensional data structure may be stored in a buffer.
Figure 11B:
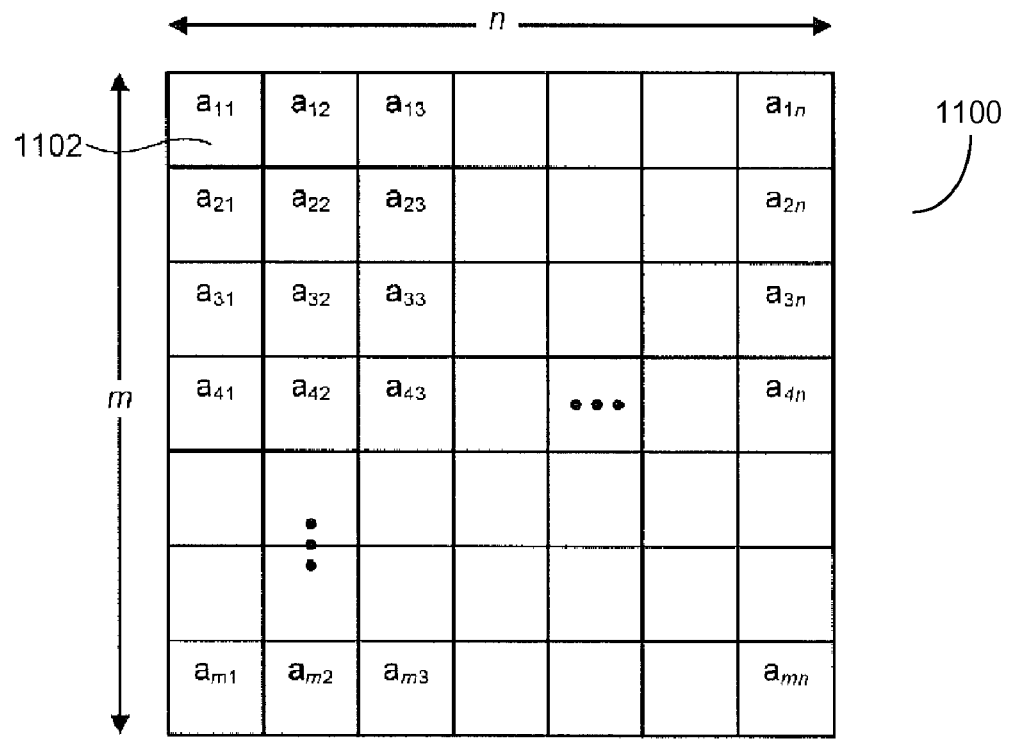
FIG. 11B is a block diagram showing the two-dimensional data structure of FIG. 11A in two dimensions.
Figure 11C:
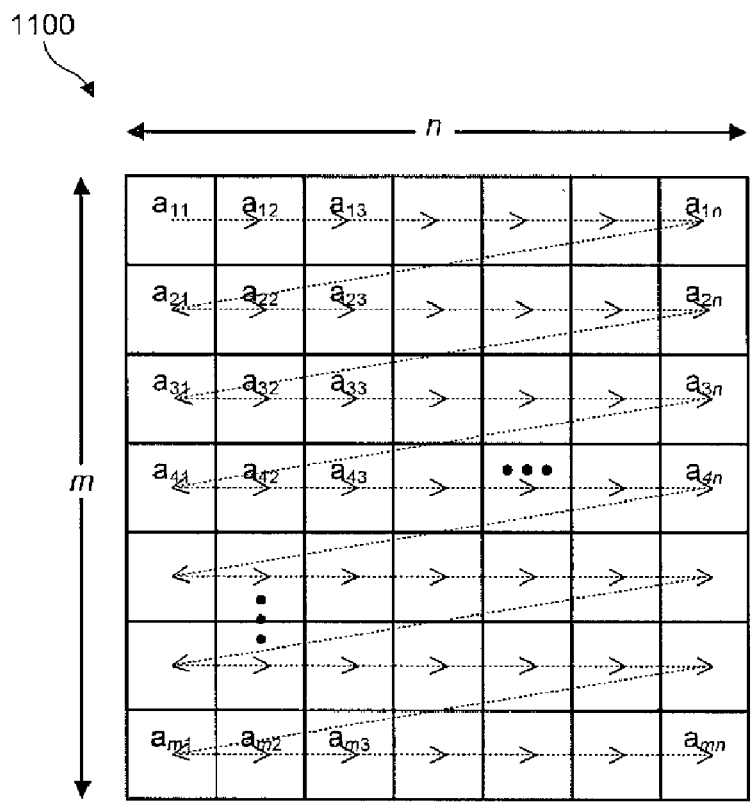
FIG. 11C is a block diagram showing one example of a first-in-first-out (FIFO) access pattern for scanning a two-dimensional data structure.

For example, referring to FIGS. 11A and 11B, consider a two-dimensional data structure stored in a buffer 900. Each vector 1000 in the buffer 900 may represent some portion of the two-dimensional data structure. In this example, each vector 1000 represents a 4×4 block of pixels, with each element of the vector 1000 representing a pixel within the 4×4 block. FIG. 11A shows the two-dimensional data structure stored in a buffer 900 in data memory 308. FIG. 11B shows the same two-dimensional data structure in two dimensions for illustration purposes. As shown in FIG. 11B, the 4×4 blocks 1102 of pixels are arranged in rows, with vectors $a_{11}$, $a_{12}$, $a_{13}$, $a_{1n}$ representing the 4×4 blocks of the first row, vectors $a_{21}$, $a_{22}$, $a_{23}$, ... $a_2$n representing the 4×4 blocks of the second row, vectors $a_{31}$, $a_{32}$, a33, ... $a_{3n}$ representing the 4×4 blocks of the third row, and so forth.

As previously mentioned, different "ports" may be used to access (i.e., read and/or write) data in a buffer 900 in different patterns. It has been found that processing video data may require the data to be accessed in different patterns. Some of these ports, more particularly the "FIFO," "nested loop," "matrix transform," and "end point pattern" ports previously discussed, will be explained in more detail in association with FIGS. 11C through 13K. In general, a port type may be selected based on the desired access pattern.

"FIFO" Port

An access pattern for a FIFO port (also known as "raster scan" access) may simply include an address increment with wrap around. For example, referring to FIG. 11C, an access pattern using a FIFO port may traverse the following path of the n×m two-dimensional data structure 1100: $a_{11}$, $a_{12}$, $a_{13}$, ... $a_{1n}$, $a_{21}$, $a_{23}$, ... $a_{2n}$, $a_{31}$, $a_{32}$, $a_{33}$, ... $a_{3n}$ and so forth. When the access pattern reaches the end of the buffer 900, it may wrap around to access the first address in the buffer 900.

"Nested Loop" Port

Figure 11D:
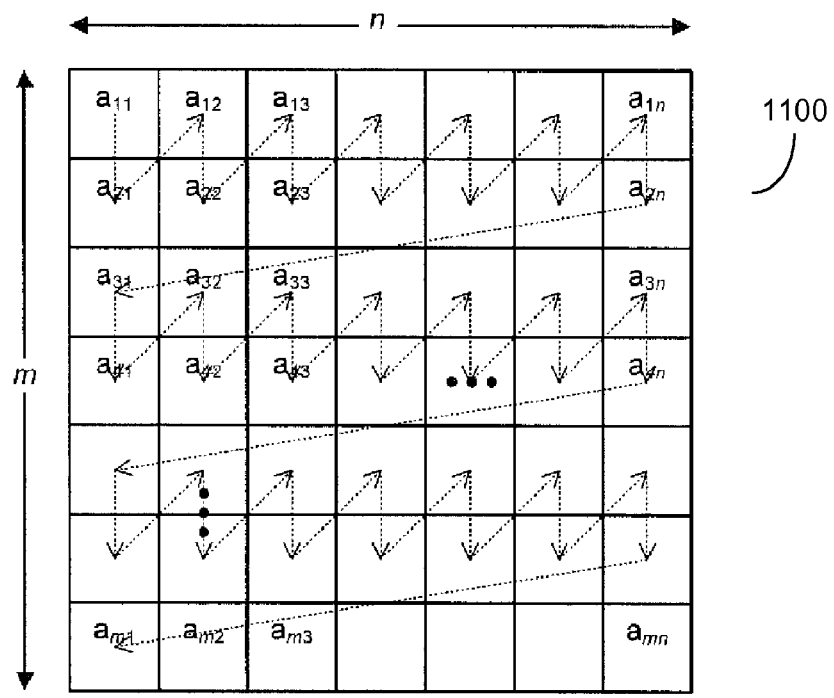
FIG. 11D is a block diagram showing one example of a nested loop access pattern for scanning a two-dimensional data structure.
Figure 12A:
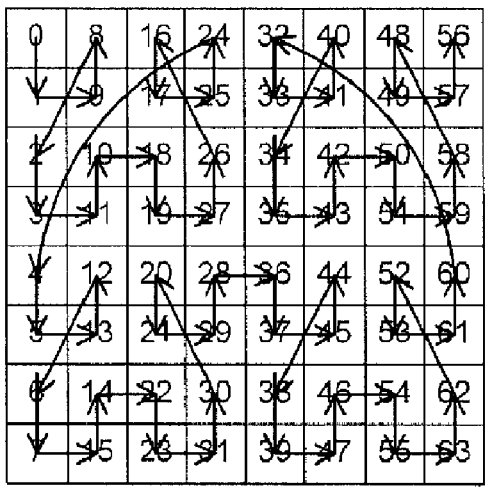
FIGS. 12A through 12E are block diagrams showing various access patterns for scanning two-dimensional data structures using matrix transforms.
Figure 12B:
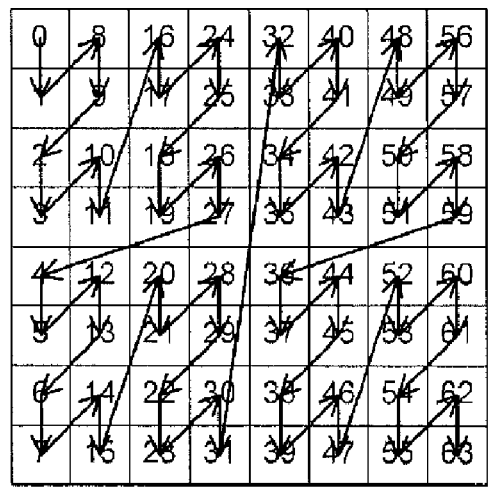
Figure 12C:
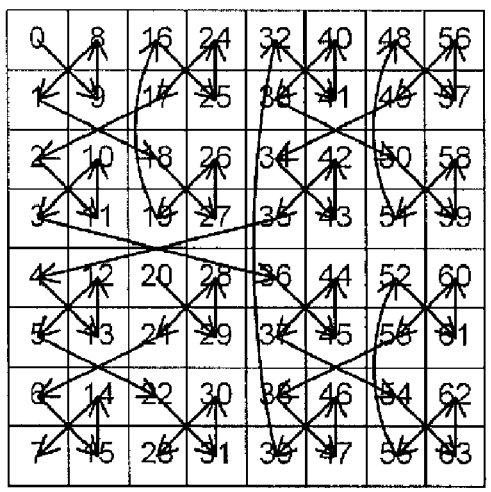
Figure 12D:
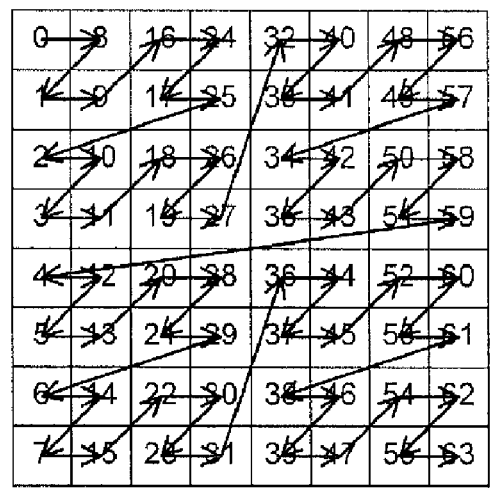
Figure 12E:
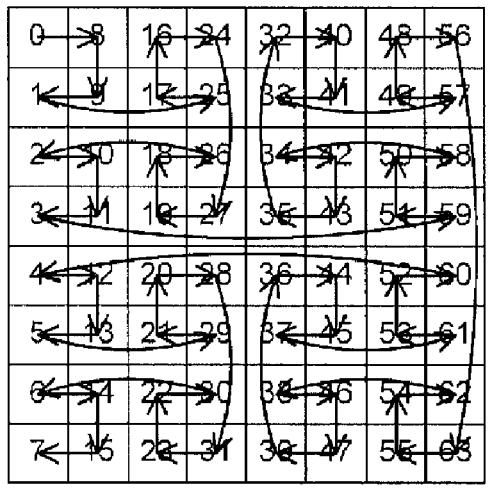

FIG. 11D shows one example of a pattern for accessing an n×m two-dimensional data structure 1100 using a "nested loop" port. This access pattern may be generated using a series of nested loops associated with a "nested loop" port. The port and associated nested loops (including the jumps (step size) and number of iterations for each loop) may be pre-programmed into the address generation unit as part of a port descriptor prior to accessing the two-dimensional data structure 1100. As shown in FIG. 11D, the access pattern follows the substantially zig-zag path (i.e., $a_{11}$, $a_{21}$, $a_{12}$, $a_{22}$, $a_{13}$, $a_{23}$, ... $a_{1n}$, $a_{2n}$, $a_{31}$, $a_{41}$, etc.). After setting the initial offset in the buffer to $a_{11}$, the access pattern may be generated in the address generation unit 310 using the following nested loops:

inner loop: jump by n (loops 1 time)
intermediate loop: jump by 1 (loops n times)
outer loop: jump by 2n (loops m/2 times)

In the above example, the loops do not inherit the starting points of the previous loops. However, in other embodiments, the loops may be configured to inherit the starting points of the previous loops. The parameters (i.e, the step-size and number of iterations for each loop) of the nested loops may be varied to generate various types of access patterns. Thus, the access pattern shown in FIG. 11D represents just one exemplary access pattern and is not intended to be limiting.

"Matrix Transform" Port

Ports having the matrix port type may have a counter multiplied by a transform matrix to determine a buffer offset 822. The matrix multiplication of a FIFO pointer (or simple counter) by a transform matrix creates a new programmable access pattern. An 8-bit offset may require a 64-entry transform matrix, where each entry is one bit. Since the matrix elements are single bits, the multiplication reduces to an AND operation, while the addition reduces to an XOR operation as shown in the equation below. The port descriptor may contain both the offset information as well as the transform matrix.

$$\begin{bmatrix} t_{11} & t_{12} & \ldots & t_{1N} \\ t_{21} & & & \\ \ldots & & & \\ t_{N1} & & & t_{NN} \end{bmatrix} \times \begin{bmatrix} a_1 \\ a_2 \\ \ldots \\ a_N \end{bmatrix} + \begin{bmatrix} b_1 \\ b_2 \\ \ldots \\ b_N \end{bmatrix} =$$

$$\begin{bmatrix} (t_{11} \& a_1)^\wedge (t_{12} \& a_2)^\wedge \ldots (t_{1N} \& a_N)^\wedge b_1 \\ (t_{21} \& a_1)^\wedge (t_{22} \& a_2)^\wedge \ldots (t_{2N} \& a_N)^\wedge b_2 \\ \ldots \\ (t_{N1} \& a_1)^\wedge (t_{N2} \& a_2)^\wedge \ldots (t_{NN} \& a_N)^\wedge b_N \end{bmatrix}$$

The matrix transform may be used to support recursive access patterns such as U-order (FIG. 12A), N-order (FIG. 12B), X-order (FIG. 12C), Z-order (FIG. 12D), and Gray-order (FIG. 12E) access patterns. The access patterns shown in FIGS. 12A through 12E are examples of patterns that may be generated with the matrix transform port and are not intended to be limiting.

"End-Point Pattern" Port

Ports having the "end-point pattern" type may be used to support non-recursive access patterns such as the wiper scan (FIG. 13A), diagonal (zigzag) scan D (FIG. 13B), raster scan R (FIG. 13C), vertical continuous wiper scan (FIG. 13D), spiral scan S (FIG. 13E), horizontal continuous raster scan C (FIG. 13F), right orthogonal (FIG. 13G), diagonal symmetry Y (FIG. 13H), horizontal symmetry M (FIG. 13I), diagonal parallel E (FIG. 13J), and diagonal secondary W (FIG. 13K). These patterns may be derived by establishing end points, and then moving between the end points to generate a desired access pattern. These patterns represent just a few patterns that are possible using the "end-point pattern" port, and are not intended to be limiting.

For example, referring to the access pattern of FIG. 13E, consider an initial set of end points 1300a, 1302a, 1304a, 1306a. The access pattern may be generated by initially moving from a first end point 1300a to a second end point 1302a, and then from the second end point 1302a to a third end point 1304a, and then from the third end point 1304a to a fourth end point 1306a. These end points 1300a, 1302a, 1304a, 1306a may then be moved or modified (by program code or other means) to new locations to continue the pattern. For example, the first end point 1300a may be moved to a fifth end point 1300b; a second end point 1302a may be moved to a sixth end point 1302b; a third end point 1304a may be moved to a seventh end point 1304b; and a fourth end point 1306a may be moved to an eighth end point 1306b. The pattern may then continue by moving from the fourth end point 1306a to the fifth end point 1300b, from the fifth end point 1300b to the sixth end point 1302b, from the sixth end point 1302b to the seventh end point 1304b, and from the seventh end point 1304b to the eighth end point 1306b, and so forth. This process may continue until the access pattern of FIG. 13E is generated. A certain step-size or jump between vectors may be defined when moving between endpoints. The end points and the jumps or step-size between end points may be programmed into the port descriptor associated with the "end point pattern" port.

The "end-point pattern" port type is useful to generate many access patterns that may be difficult or impossible to generate using other port types. This algorithm may also be useful in many mathematical operations, particularly faster search algorithms to improve encoding efficiency.

"Non-Recursive Pattern" Port

This type of port may be used to support non-recursive access patterns that are not achievable or supported using the matrix transform port or other types of ports. In general, the "non-recursive pattern" port may be similar to the "nested loop" port except that it may use consecutive loops (i.e., sequential loops) instead of nested loops to generate addresses.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for generating a real address in a data memory in response to a read/write request, the method comprising:
    generating an access request to at least one of read and write data to the data memory;
    receiving a connection ID in association with the access request, the connection ID comprising a buffer ID designating a buffer in the data memory in which to access the data, and a port ID designating a pattern in which to access the data in the buffer;
    translating the connection ID into the real address in the data memory;
    and accessing the data in the data memory at a location corresponding to the real address.

2. The method of claim 1, wherein the buffer comprises a consecutive set of locations in the data memory.

3. The method of claim 1, wherein the buffer is selected from the group consisting of a point-to-point, broadcast, scatter, and gather buffer.

4. The method of claim 1, wherein the pattern is selected from the group consisting of a first-in-first-out (FIFO), nested loop, matrix transform, non-recursive loop, and end-point pattern.

5. The method of claim 1, in which translating the connection ID into the real address in the data memory is automatically done by an address generation unit; and
    wherein the address generation unit comprises at least one custom VLSI circuit or gate array, or at least one programmable processor, or at least one programmable hardware device selected from the group consisting of field programmable gate arrays, programmable array logic, and programmable logic devices.

6. The method of claim 1, further comprising a storing, in a buffer descriptor table, a buffer descriptor associated with the buffer identifier (ID).

7. The method of claim 6, further comprising updating the buffer descriptor after accessing the data in the data memory.

8. The method of claim 6, wherein the buffer descriptor describes at least one of a buffer type, buffer attributes, and a buffer base address.

9. The method of claim 1, further comprising storing, in a port table, a port descriptor associated with the port ID; and
    updating the port descriptor after accessing the data in the data memory.

10. The method of claim 9, wherein the port descriptor describes at least one of a port type, port attributes, and a port offset.

11. A system to generate a real address in a data memory in response to a read/write request, the system comprising:
    an array of processing elements to generate an access request, the access request comprising at least one of a read request and a write request;
    an address generation unit to receive a connection ID in association with the access request, the connection ID comprising a buffer ID designating a buffer in the data memory in which to access data, and a port ID designating a pattern in which to access the data in the buffer;
    the address generation unit configured to translate the connection ID into the real address in the data memory;
    and the array of processing elements configured to access data in the data memory at a location corresponding to the real address.

12. The system of claim 11, wherein the buffer comprises a consecutive set of locations in the data memory.

13. The system of claim 11, wherein the buffer is selected from the group consisting of a point-to-point, broadcast, scatter, and gather buffer.

14. The system of claim 11, wherein the pattern is selected from the group consisting of a first-in-first-out (FIFO), nested loop, matrix transform, non-recursive, and end-point pattern.

15. The system of claim 11, in which the address generation unit comprises at least one custom VLSI circuit or gate array, or at least one programmable processor, or at least one programmable hardware device selected from the group consisting of field programmable gate arrays, programmable array logic, and programmable logic devices.

16. The system of claim 11, wherein the address generation unit comprises a buffer descriptor table to store a buffer descriptor associated with the buffer identifier (ID).

17. The system of claim 16, wherein the address generation unit is configured to update the buffer descriptor after the data is accessed in the data memory.

18. The system of claim 16, wherein the buffer descriptor describes at least one of a buffer type, buffer attributes, and a buffer base address.

19. The system of claim 11, wherein the address generation unit comprises a port table to store a port descriptor associated with the port ID; and
    wherein the address generation unit is configured to update the port descriptor after the data is accessed in the data memory.

20. The system of claim 19, wherein the port descriptor describes at least one of a port type, port attributes, and port offset.

21. A method for generating a real address in a data memory in response to a read/write request, the method comprising:
- generating an access request to at least one of read and write data to the data memory;
  - receiving a connection ID in association with the access request, the connection ID designating at least one of a buffer in the data memory in which to access data, and a pattern in which to access the data in the buffer;
  - translating the connection ID into a real address in the data memory;
- in which translating the connection ID into the real address in the data memory is automatically done by an address generation unit; and
- wherein the address generation unit comprises at least one custom VLSI circuit or gate array, or at least one programmable processor, or at least one programmable hardware device selected from the group consisting of field programmable gate arrays, programmable array logic, and programmable logic devices;
- wherein the pattern is selected from the group consisting of a first-in-first-out (FIFO), nested loop, matrix transform, non-recursive loop, and end-point pattern;
- and accessing the data in the data memory at the location corresponding to the real address.

22. A system to generate a real address in a data memory in response to a read/write request, the system comprising:
- an array of processing elements to generate an access request, the access request comprising at least one of a read request and a write request;
- an address generation unit to receive a connection ID in association with the access request, the connection ID designating at least one of a buffer in the data memory in which to access data, and a pattern in which to access the data in the buffer;
- the address generation unit configured to translate the connection ID into the real address in the data memory;
- wherein the address generation unit comprises at least one custom VLSI circuit or gate array, or at least one programmable processor, or at least one programmable hardware device selected from the group consisting of field programmable gate arrays, programmable array logic, and programmable logic devices;
- and the array of processing elements further configured to access the data in the data memory at a location corresponding to the real address.

* * * * *